A. BRISBANE.
INSECT DESTROYING APPARATUS.
APPLICATION FILED JULY 6, 1909.
993,644.
Patented May 30, 1911.
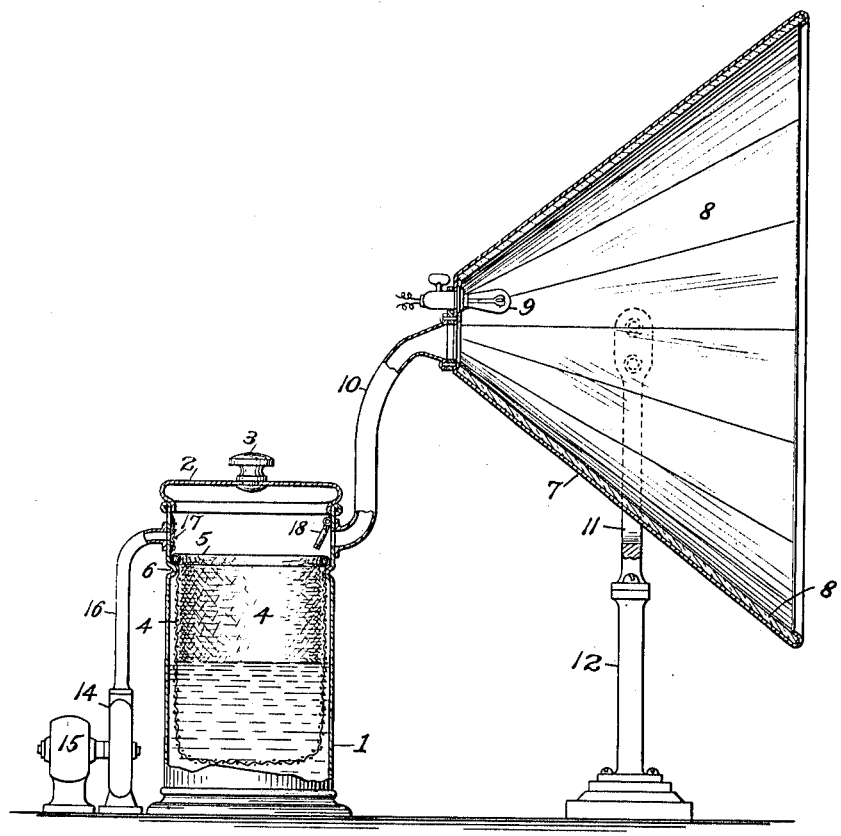

UNITED STATES PATENT OFFICE.

ARTHUR BRISBANE, OF NEW YORK, N. Y.

INSECT-DESTROYING APPARATUS.

993,644.  Specification of Letters Patent.  Patented May 30, 1911.

Application filed July 6, 1909. Serial No. 506,038.

*To all whom it may concern:*

Be it known that I, ARTHUR BRISBANE, a citizen of the United States, residing at New York city, county of New York, and State of New York, have invented certain new and useful Improvements in Insect-Destroying Apparatus, fully described and represented in the following specification and the accompanying drawings, forming a part of the same.

This invention relates to certain improvements in apparatus for capturing and destroying insects.

It is the object of the invention to enable insects, especially night flying insects, to be captured and destroyed in large numbers at slight expense and with simple apparatus.

Generally speaking this object is carried into effect by providing a funnel-shaped reflector which is illuminated for the purpose of attracting insects. The reflector is connected with a tank which is adapted to contain kerosene oil, or other substance which will quickly destroy insects, the insects being drawn from the reflector to the tank by a current of air induced by a suction pump or other means.

For a better understanding of the invention, a detailed description will now be given in connection with the accompanying drawing the figure of which is a side view, partly in section, of one form of apparatus for effecting the desired object.

Referring to said figure, 1 indicates a tank of suitable configuration and proportions and which is adapted to hold an insect destroying liquid, such as kerosene, or the like, this tank being closed by a cover 2 provided with a handle 3 by which it may be opened for filling with liquid and for the removal of the captured and destroyed insects. For easily removing the captured insects, there is provided a receptacle 4 located in the interior of the tank 1. This receptacle may be of any suitable or desired material, but preferably will be a cloth bag, cloth being chosen because it is easily permeated by the liquid in the tank. This cloth bag 4 is open at the mouth and at the mouth is provided with a ring 5 of any suitable material, which ring is adapted to fit over and to be supported by a bead 6 formed in the side walls of the tank, the bag 4 being thus securely supported in place.

The reflector for attracting the insects may be of any suitable configuration or material. In the particular construction shown, there is provided a funnel-shaped device 7 very wide at the outer end and narrowing sharply at the inner end, this funnel shaped device being of any suitable material, such as brass or tin. Within the funnel is located a reflecting surface 8 of any suitable material, such as glass, this reflecting surface serving to increase the illumination and consequently the radius of action of the apparatus. The whole interior of the funnel is preferably lined with the reflecting material. This reflector is furthermore as shown arranged to reflect outwardly and upwardly, thus acting as a search light and having a wide range.

The reflector is illuminated in any suitable manner. In the particular construction shown, there is provided an electric light, 9, connected with any suitable source of electric power, not shown. This light extends into the funnel, and in the preferred construction is located as near the narrow end of the funnel as is practicable, being supported therein in any suitable manner. The reflector may be connected with the tank in any suitable manner. In the particular construction shown, it is connected with the tank by a pipe 10, this pipe 10 being connected with and opening at one end into the narrow end of the funnel-shaped reflector and at the other end opening into the tank 1 above the removable receptacle 4. When this construction is used the funnel shaped receptacle 7 is or may be supported by arms 11 mounted on a suitable standard 12.

Any desired means may be employed for inducing a current of air to flow from the reflector into the tank for drawing the attracted insects from the reflector into the tank. In the particular construction illustrated, there is provided for this purpose a suction pump 14 driven by a motor 15 connected with any suitable source of power, not shown. The pump is, furthermore, so located relatively to the tank and reflector that the tank lies between the reflector and the pump, this construction being desirable in order that the insects may be drawn into the tank without passing through the pump, thus avoiding clogging the pump. In the particular construction illustrated, the pump 14 is located next that side of the tank opposite the reflector and is connected with the tank by a pipe 16 entering the tank above the removable receptacle 4. The end of this pipe entering the tank is covered with a screen 17 of small wire mesh, or other suitable material, so that the insects drawn into the tank will not be drawn into the suction pump.

If for any reason the pump should fail to work, means are provided by which any insect drawn into the tank is prevented from escaping therefrom. These means, as shown, comprise a flap valve 18 which covers the end of the pipe 10 which enters the tank 1. This flap valve is a pivoted valve and is lifted by the suction of the pump. If, for any reason, the suction of the pump fails and the suction ceases, this flap valve falls by gravity and closes the entrance of the pipe 10.

It will be understood that the invention is not to be limited to the precise construction shown and described but that variations and changes may be made in the same without departing from the invention.

What is claimed is:—

1. In an apparatus of the character described, the combination of a tank having therein a quantity of liquid as kerosene or the like, a removable container located in the liquid, a reflector, a pipe connecting the reflector with the tank above the liquid therein, means for illuminating the reflector, a suction pump and connections from the pump communicating with the tank above the liquid therein for inducing a current of air to flow from the reflector into the tank.

2. In an apparatus of the character described, the combination of a tank having therein a quantity of liquid as kerosene or the like, a removable container positioned in the liquid, a reflector having a restricted outlet, a pipe connecting the reflector with the tank above the liquid therein, means for illuminating the reflector, a suction pump for inducing a current of air to pass from the reflector into the tank and connections including a pipe connecting the suction pump with the tank above the liquid therein, a screen being provided over the end of the pipe for preventing insects from being drawn through the pipe into the suction pump.

In testimony whereof, I have hereunto set my hand, in the presence of two subscribing witnesses.

ARTHUR BRISBANE.

Witnesses:
S. S. CONNELLO,
P. B. PHILIPP.